United States Patent
Ellis et al.

(10) Patent No.: US 11,541,918 B2
(45) Date of Patent: Jan. 3, 2023

(54) EXTENSION LOGIC FOR HYPERLOOP/MAGLEV VEHICLE

(71) Applicants: SAFRAN LANDING SYSTEMS, Velizy-Villacoublay (FR); SAFRAN LANDING SYSTEMS CANADA INC., Ajax (CA)

(72) Inventors: Andrew Michael Ellis, Guelph (CA); Graeme Peter Arthur Klim, Vélizy-Villacoublay (FR); Thibaud Mazoue, Nogent-sur-Marne (FR)

(73) Assignees: SAFRAN LANDING SYSTEMS, Velizy Villacoublay (FR); SAFRAN LANDING SYSTEMS CANADA INC., Ajax (CA)

( * ) Notice: Subject to any disclaimer, the term of this patent is extended or adjusted under 35 U.S.C. 154(b) by 480 days.

(21) Appl. No.: 16/828,230

(22) Filed: Mar. 24, 2020

(65) Prior Publication Data

US 2021/0300445 A1 Sep. 30, 2021

(51) Int. Cl.
*B61F 13/00* (2006.01)
*B60L 13/06* (2006.01)
*B61F 3/14* (2006.01)

(52) U.S. Cl.
CPC .............. *B61F 13/00* (2013.01); *B60L 13/06* (2013.01); *B61F 3/14* (2013.01)

(58) Field of Classification Search
CPC ............. B61F 13/00; B61F 3/14; B60L 13/06
See application file for complete search history.

(56) References Cited

U.S. PATENT DOCUMENTS 8,175,758 B2   5/2012   Mouton
2010/0126374 A1*   5/2010   Ji ............................ B61B 13/08
                                                              104/282

(Continued)

FOREIGN PATENT DOCUMENTS

CN   103 612 635 A   3/2014
CN   207 291 998 U   5/2018
FR   3 070 139 A1   2/2019

OTHER PUBLICATIONS

International Search Report and Written Opinion dated Jul. 1, 2021, issued in corresponding International Application No. PCT/EP2021/057155, filed Mar. 19, 2021, 11 pages.

*Primary Examiner* — Hussein Elchanti
(74) *Attorney, Agent, or Firm* — Christensen O'Connor Johnson Kindness PLLC

(57) ABSTRACT

A disclosed method extends a support system for a maglev vehicle, the support system having at least a first landing gear assembly and a second landing gear assembly. The method includes the steps of determining a weight-on-wheels status for each of the first and the second landing gear assemblies and determining a distance from each of the first and second landing gear assemblies to a support surface. First and second extension speeds are determined for each of the first and second landing gear assemblies, respectively. The first landing gear assembly is extended at the first extension speed until the first landing gear assembly reaches a weight-on-wheels condition, and the second landing gear assembly is extended at the second extension speed until the second landing gear assembly reaches the weight-on-wheels condition.

14 Claims, 6 Drawing Sheets

(56) References Cited

U.S. PATENT DOCUMENTS

| | | | |
|---|---|---|---|
| 2015/0251561 A1* | 9/2015 | Konigorski | B64F 1/0299 |
| | | | 244/100 R |
| 2018/0312245 A1 | 11/2018 | Klim et al. | |
| 2021/0221340 A1* | 7/2021 | Annadurai | B60T 7/22 |
| 2022/0177118 A1* | 6/2022 | Sharpe | F15B 15/224 |

* cited by examiner

EXTENSION LOGIC FOR HYPERLOOP/MAGLEV VEHICLE

BACKGROUND

Magnetically levitated ("maglev") transportation systems, such as a Hyperloop vehicle, provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, maglev systems are able to provide greater travel speeds and improved efficiency.

When traveling at low speeds or stopped, the vehicles do not levitate, but are instead supported by a support system that includes a plurality of independently controlled landing gear assemblies. Like aircraft landing gear, the maglev support systems reciprocate between an extended (deployed) position and retracted (stowed) position by extending and retracting the individual landing gear assemblies. When the vehicles are levitated, the support system is retracted, and the wheels of the landing gear assemblies do not contact the ground. When the vehicles are traveling at low speeds or stopped, the support system is extended so that the wheels of the landing gear assemblies contact a ground surface to support the vehicles.

In some embodiments, the landing gear assemblies are grouped on two or more independent bogies (like a train). Each landing gear assembly includes a wheel assembly that is extendable and retractable by an actuator. The actuator, which may be hydraulic, electric, pneumatic, etc., is configured to control the position of the wheel assembly so that the landing gear assemblies control the height of the vehicle relative to the ground interface (track) when the vehicle is supported by the support system.

FIG. 1 shows an embodiment of a known extendable and retractable landing gear assembly 20 suitable for use as part of a wheeled support system for a maglev vehicle. The landing gear assembly 20 is disclosed in U.S. Patent Application Publication 2018/0312245 ("Klim et al."), filed Apr. 26, 2017, and currently assigned to Safran Landing Systems Canada Inc., the disclosure of which is expressly incorporated herein. The landing gear assembly 20 includes a wheel assembly 22 that is selectively reciprocated between an extended position and a retracted position by an actuator 24.

As shown in FIG. 1, the wheel assembly 22 includes a pair of wheels 30 rotatably mounted to an axle 32 that is positioned at one end of a trailing arm body 34. A pivot pin 36 is positioned at the other end of the trailing arm body 34 and rotatably couples the trailing arm body to the vehicle.

The actuator 24 comprises a housing 38 pivotably mounted to a vehicle (not shown), such as an aircraft or a maglev vehicle. A shock absorber 40 extends through an aperture in the housing 38 and includes a cylinder 42 and a piston 44 slidingly engaged with the cylinder. The piston 44 is pivotably connected to the trailing arm body 34 of the wheel assembly 22. A torsion link assembly 46 maintains the rotational position of the trailing arm body 34 relative to the housing 38 about the longitudinal axis of the piston 44.

The cylinder 42 includes an external screw thread 48 that engages an internal screw thread formed in the aperture of the housing 38. A motor 50 is fixed to the housing 38 and selectively rotates the cylinder 42. Rotation of the cylinder 42 moves the piston 44 in an axial direction. The axial movement of the piston 44 rotates the wheel assembly 22 about its pivotal connection to the vehicle, thereby extending and retracting the landing gear assembly 20.

It will be appreciated that the disclosed landing gear assembly 20 is exemplary only and should not be considered limiting. In this regard, various wheel assemblies are possible. In some embodiments, the landing gear assembly includes one or more of braking and/or motorized wheels, enabling the landing gear assemblies to brake/decelerate (using brakes and/or wheel drives) and accelerate (using wheel drives). Some embodiments include two-wheel assemblies equipped with brakes (electric or hydraulic) and/or two-wheel assemblies equipped with at least one electric wheel per bogie. Still other embodiments may include combinations of the already mentioned and unequipped wheel assemblies (load bearing with extension/retraction function, no brakes, no wheel drive). These and other embodiments are contemplated and should be considered within the scope of the present disclosure.

Deployment of landing gear assemblies for a maglev vehicle presents particular challenges not typically faced by similar landing gear assemblies used in aircraft. For typical aircraft applications, all of the landing gear assemblies reach their fully extended position well before the aircraft touches down. In a maglev vehicle application, unsupervised free extension of the landing gear assemblies can result in conditions in which one or more wheels touch down and begin bearing load before the others. This can cause a number of undesirable issues.

Large magnetic suspensions are inherently unstable such that upon excitation, the suspensions will oscillate until externally damped. For a maglev vehicle, touchdown of one or more landing gear assemblies before the rest can cause the vehicle to rotate about its center of gravity, resulting in an oscillation in the pitch and/or roll directions. Touchdown of one or more landing gear assemblies before the others can also result in undesirable vehicle tilt and/or excess single wheel loads. Each of these conditions may result in one or more landing gear assemblies being loaded beyond typical operating loads, thus potentially reducing the fatigue life of the landing gear components.

SUMMARY

The subject matter disclosed herein provides a method providing controlled extension of the support system of a maglev vehicle. The support system includes a plurality of landing gear assemblies, and the method extends the landing gear assemblies so that the landing gear assemblies achieve a weight-on-wheels condition at approximately the same time.

An embodiment of a method of extending a support system for a maglev vehicle is disclosed. The support system includes a first landing gear assembly and a second landing gear assembly. The method further includes the steps of determining a weight-on-wheels status for each of the first and the second landing gear assemblies and determining a distance from each of the first and second landing gear assemblies to a support surface. A first extension speed is determined for the first landing gear assembly, and a second extension speed is determined for the second landing gear assembly. The first landing gear assembly is extended at the first extension speed until the first landing gear assembly reaches a weight-on-wheels condition, and the second landing gear assembly is extended at the second extension speed until the second landing gear assembly reaches the weight-on-wheels condition.

In any embodiment, the method further includes the steps of receiving a command to stop extension of the support system and stopping further extension of the support system in response to the received command.

In any embodiment, the method further includes the steps of receiving a command to retract the support system and stopping further extension of the support system and retracting the support system in response to the received command.

In any embodiment, the first and second extension speeds are set so that the first and second landing gear assemblies reach the weight-on-wheels condition simultaneously.

In any embodiment, each of the first and second extension speeds vary during extension of the support system in response to feedback regarding the distance from each of the first and second landing gear assemblies, respectively, to the support surface.

In any embodiment, each of the first and second extension speeds decreases as the first and second landing gear assemblies approach the weigh-on-wheels condition.

In any embodiment, the method further includes the step of continuing to extend the first landing gear assembly after reaching the weigh-on-wheels condition.

In any embodiment, the method further includes the step of determining a post weight-on-wheels extension speed, wherein the first landing gear assembly is extended at the post weight-on-wheels extension speed after reaching the weigh-on-wheels condition.

In any embodiment, the extension of the first landing gear assembly terminates after a predetermined amount of time has passed after the first landing gear assembly reached the weight-on-wheels condition.

In any embodiment, the extension of the first landing gear assembly terminates when the second landing gear assembly reaches the weight on wheels condition if the second landing gear assembly reaches the weight on wheels condition before the predetermined amount of time has passed.

In any embodiment, a post-extension motion may be provided by the vehicle to be executed after reaching the weight on wheels condition.

In any embodiment, the post-extension motion may continue the extension of the gears until the vehicle reaches a predetermined height off the support surface.

In any embodiment, the motion of the first and second landing gears continue after reaching the weight on wheels condition or reaching a predetermined height in order to stabilize the vehicle's motion.

In an embodiment, a vehicle is provided, which includes first and second landing gear assemblies. The vehicle further includes a controller programmed to extend the first and second landing gear assemblies according a method that includes the steps of determining a weight-on-wheels status for each of the first and the second landing gear assemblies and determining a distance from each of the first and second landing gear assemblies to a support surface. The method further includes determining first and second extension speeds for each of the first and second landing gear assemblies, respectively. The first landing gear assembly extends at the first landing gear speed until the first landing gear assembly reaches a weight-on-wheels condition, and the second landing gear assembly extends at the second landing gear speed until the second landing gear assembly reaches the weight-on-wheels condition.

In any embodiment, the vehicle further includes a first sensor configured to sense a first distance from a feature of the first landing gear assembly to the support surface and a second sensor configured to sense a second distance from a feature of the second landing gear assembly to the support surface.

In any embodiment, each of the first and second landing gear assemblies includes a wheel assembly and an actuator assembly operably coupled to the wheel assembly to reciprocate the wheel assembly between an extended position and a retracted position. Each landing gear assembly further includes a motor control unit programmed to control the actuator to selectively position the wheel assembly.

In any embodiment, a non-transitory computer-readable medium has computer-executable instructions stored thereon that, in response to execution by a control unit of a vehicle, cause the control unit to perform actions. The actions include determining a weight-on-wheels status for each of the first and the second landing gear assemblies and determining a distance from each of the first and second landing gear assemblies to a support surface. The actions further include setting a first and second extension speed for each of the first and second landing gear assemblies, respectively. The first landing gear assembly is extended at the first landing gear speed until the first landing gear assembly reaches a weight-on-wheels condition, and the second landing gear assembly is extended at the second landing gear speed until the second landing gear assembly reaches the weight-on-wheels condition.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of disclosed subject matter will become more readily appreciated as the same become better understood by reference to the following detailed description, when taken in conjunction with the accompanying drawings, wherein.

DETAILED DESCRIPTION

A maglev vehicle with a retractable support system is provided. The support system includes a plurality of independently actuated landing gear assemblies. In order to provide coordinated extension of the landing gear assemblies, a control unit, such as a control circuit, is provided that supervises and actively controls extension of the landing gear assemblies in order to control the positions of the landing gear assemblies throughout the extension of the support system.

Figure 1:
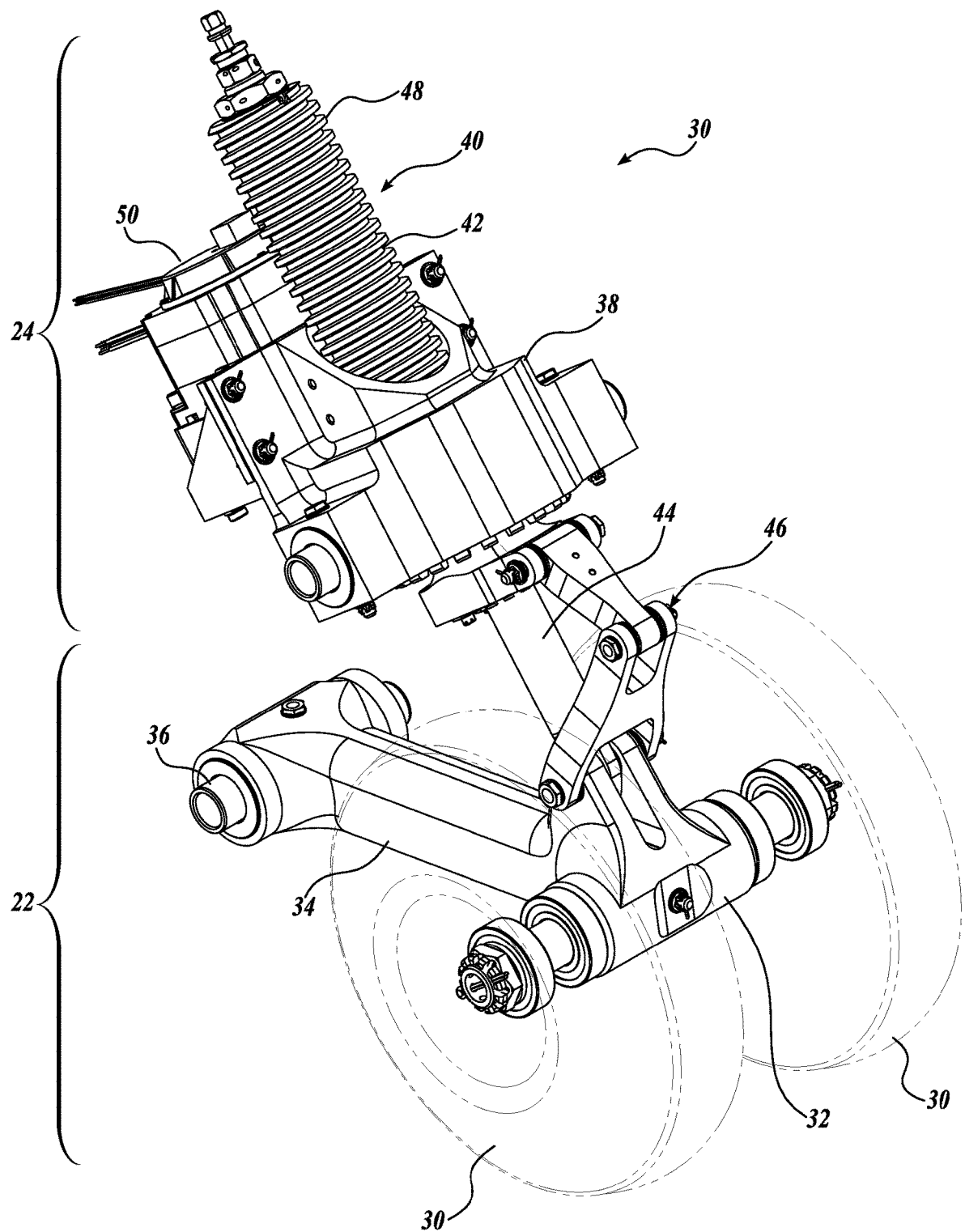
FIG. 1 shows an isometric view of a known embodiment of a deployable and retractable landing gear assembly suitable for use as part of a support system for a maglev vehicle.
Figure 2:
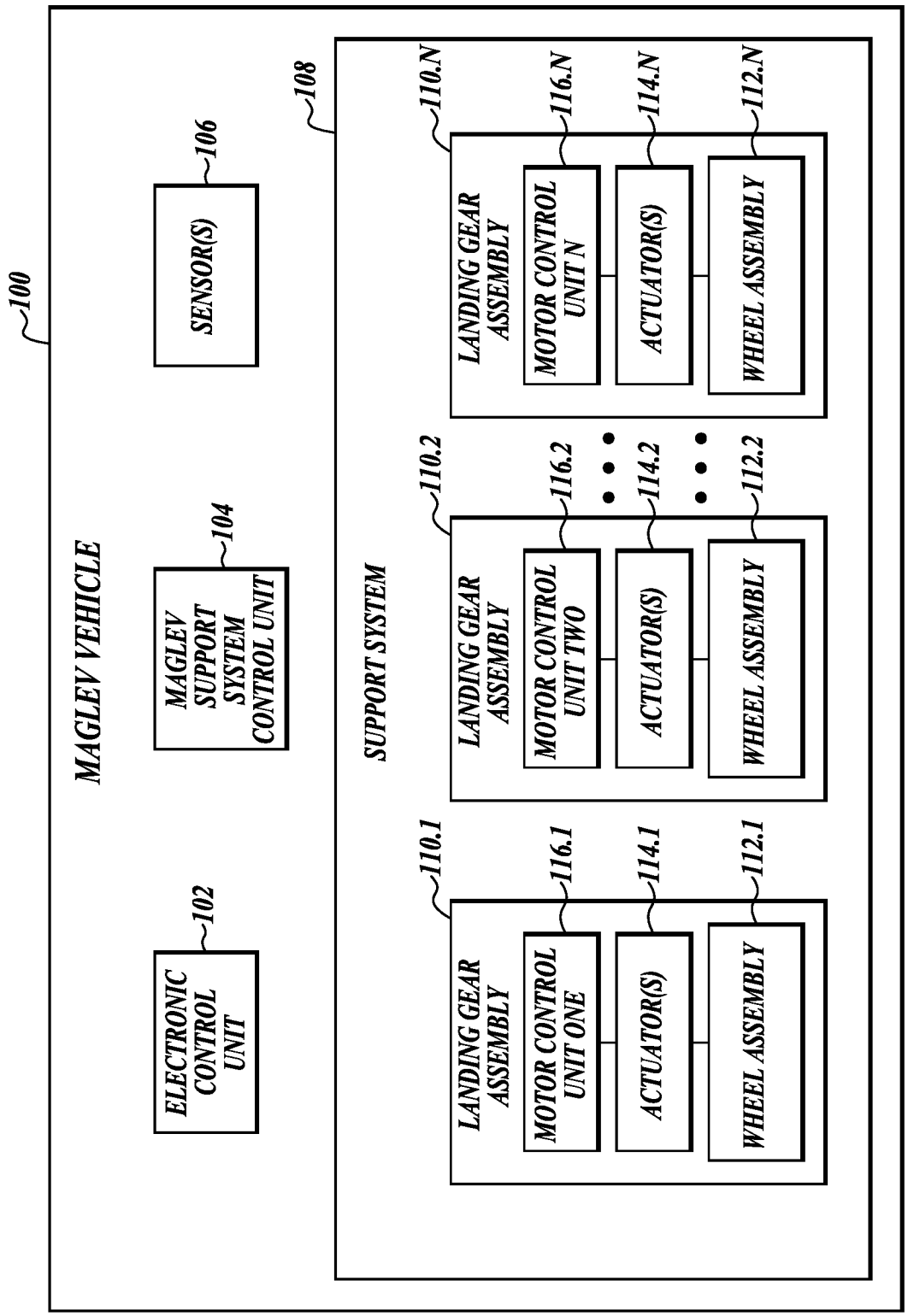
FIG. 2 shows a block diagram that illustrates a representative embodiment of a vehicle according to various aspects of the present disclosure.

FIG. 2 shows a schematic view of a representative embodiment of a maglev vehicle 100 with a number (N) of landing gear assemblies. As illustrated, the maglev vehicle 100 includes a central electronic control unit (ECU 102) that is responsible for overall control of the operation of the maglev vehicle 100. The ECU 102 is communicatively coupled to a maglev support system control unit (MSSCU) 104 that is responsible for coordinating the state of all components of the support system 108. The support system 108 includes a plurality of landing gear assemblies, including illustrated landing gear assemblies 110.1, 110.2, and 110.N. To that end, the MSSCU 104 is communicatively coupled to one or more motor control units (MCUs), including the illustrated MCUs 116.1, 116.2, and 116.N, and may transmit control inputs to the MCUs. Each MCU controls one or more actuators, such as actuators 114.1, 114.2, and 114.N, which drive extension, retraction, and active vehicle height control for corresponding wheel assemblies 112.1, 122.2, and 132.N, respectively.

In some embodiments, the various control units include a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

As illustrated, the maglev vehicle 100 also includes one or more sensor(s) 106. These sensor(s) 106 may include landing gear state sensors capable of generating values that represent states including, but not limited to, whether the landing gear is in contact with the ground, whether the landing gear has reached static stroke, an amount of compression of a shock absorber of the landing gear, and the distance from a landing gear assembly component to a support surface. These sensor(s) 106 may also include vehicle state sensors capable of generating values that represent states including, but not limited to, a vehicle speed and a distance between a component of the maglev vehicle 100 and a levitation mechanism. Any suitable types of devices may be used to create these sensor(s) 106, including but not limited to shaft encoders, photosensors, sonic rangefinders, and laser measurement devices. In some embodiments, the sensor(s) 106 are communicatively coupled to the ECU 102 and/or the MSSCU 104, and values generated by the sensor(s) 106 may be transmitted to the ECU 102 and/or the MSSCU 104.

In some embodiments, additional copies of ECU 102, MSSCU 104, and/or other components may be provided for redundancy. Further, the components of maglev vehicle 100 may be communicatively coupled via any suitable communication technique, including but not limited to serial wired communication, wireless communication (via Bluetooth, Wi-Fi, or other wireless communication techniques), and/or networked wired communication (via USB, Ethernet, CAN-BUS, or other wired communication techniques). Also, the separation of functionality between the ECU 102 and MSSCU 104 is an example only, and in some embodiments, functionality of the ECU 102 and MSSCU 104 may be combined in a single device.

One of skill in the art will recognize that embodiments of the maglev vehicle 100 may also include other components, including but not limited to magnets and/or other components of a levitation system, and a passenger/cargo cabin. Such components have not been illustrated in FIG. 2 to avoid obscuring other aspects of the present disclosure. Further, three of the N landing gear assemblies that form the support system 108 are shown in FIG. 2 with the understanding that the remaining (N–3) landing gear assembly or assemblies are similarly configured. In addition, one of skill in the art will recognize that the alternate embodiments of the support system 108 may include different numbers N of landing gear assemblies (and associated components), and such variations should be considered within the scope of the present disclosure.

Figure 3:
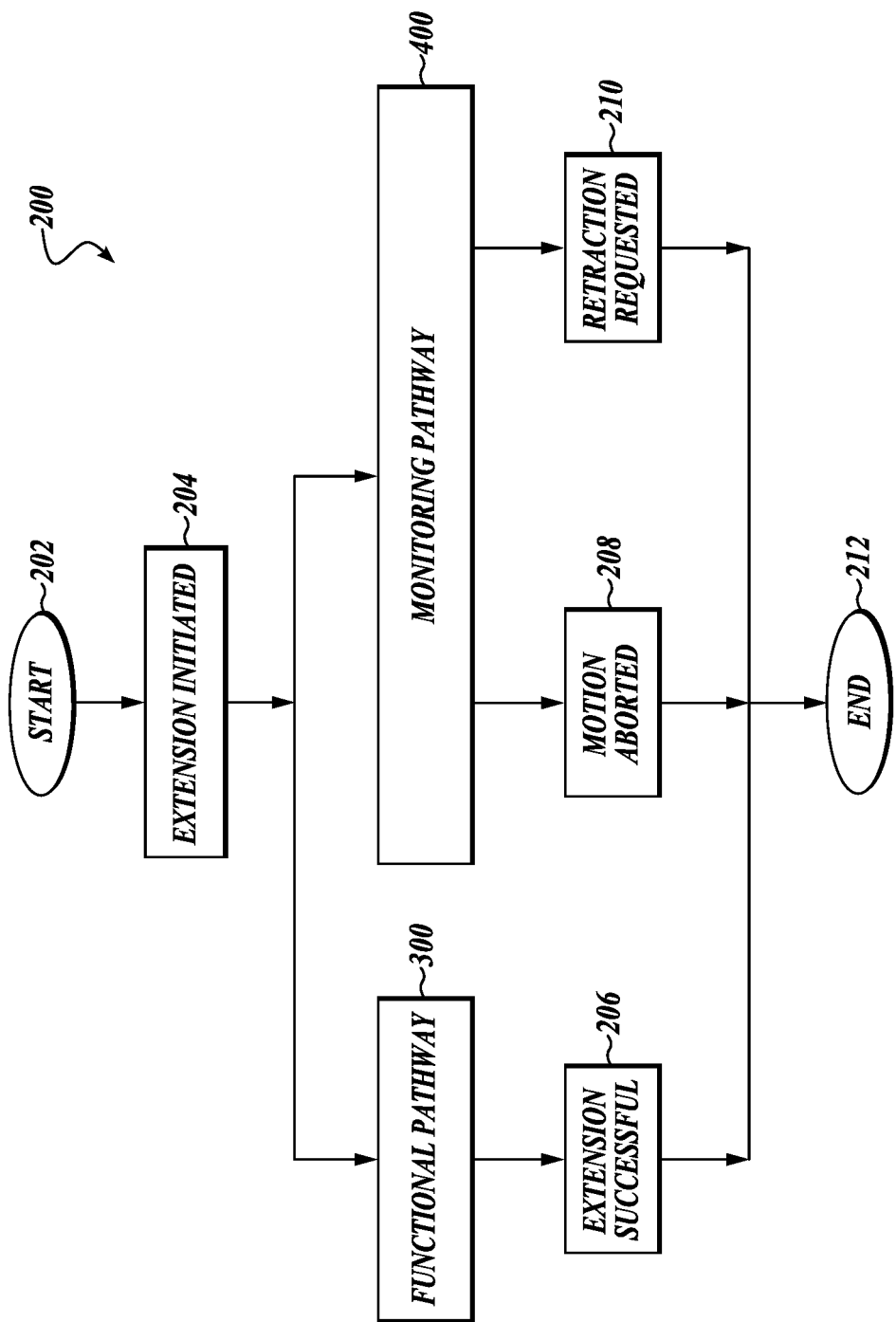
FIG. 3 shows a flow chart of a representative embodiment of a method for extending a support system of a maglev vehicle according to the present disclosure.

FIG. 3 shows a representative embodiment of a method 200 of extending a support system for a maglev vehicle 100. In an embodiment, the ECU 102, MSSCU 104, and the MCUs 116.1, 116.2, and 116.N, alone or in combination with other suitable processors and/or controllers, are programmed to carry out steps of the method 200. In an embodiment, the ECU, the MSSCU, and/or the MCU are programmed to carry out one or more steps of the methods of Claims 1-10.

The method 200 is described with reference to a weight-on-wheels state (WoW) for each landing gear assembly 110.1, 110.2, and 110.N, wherein WoW is present, i.e., "TRUE," for a landing gear assembly when any weight of the maglev vehicle 100 is being borne by that landing gear assembly. In some embodiments, WoW may be determined based on the breakout of a shock absorber, such that the WoW state will be considered TRUE when the compression of the shock absorber is compared to a threshold compression, and the threshold compression of the shock absorber is passed (and will otherwise be considered false). In some embodiments, other conditions may be considered to determine WoW. For example, in some embodiments, any time the tires or other ground engaging member of the landing gear are in contact with the ground (also known as "touchdown") may be considered a condition in which WoW is TRUE. As another example, in some embodiments, the WoW may be considered to be TRUE once static stroke has been reached.

The method 200 starts at block 202, and proceeds to block 204, wherein extension of the support system 108 is initiated. The method 200 proceeds along parallel paths to block 300, which represents a functional pathway, and block 400, which represents a monitoring pathway. The functional pathway of block 300 controls extension of the landing gear assemblies that make up the support system 108. When all of the landing gear assemblies have reached a WoW state in block 300, the method 200 proceeds to block 206, in which a successful extension is indicated. The method 200 then proceeds to block 212 and ends.

In the monitoring pathway of block 400, the vehicle 100 is monitored for commands directed to the support system 108 and for system faults. In the disclosed embodiment, if a command to stop extension is received, or if a fault is detected with one or more of the landing gear assemblies, the method 200 proceeds to block 208, in which the extension motion is aborted. The method 200 then proceeds to block 212 and ends. Similarly, if a command to retract the landing gear assemblies is received, then the method 200 proceeds to block 210, in which a retraction request is indicated. With the retraction request indicated at block 210, the method 200 proceeds to block 212 and ends.

Still referring to FIG. 3, blocks 300 and 400 are shown as being performed in parallel, with the method 200 proceeding to any of blocks 206, 208, and 210, depending upon whether (1) a fault is detected, or (2) a command is received before the support system 108 completes the extension motion. Because reaching any of blocks 206, 208, and 210 will stop the extension motion, the method 200 proceeds to block 212 and ends as soon as one of blocks 206, 208, and 210 is reached. That is, the method ends when the support system 108 achieves successful extension (block 206), the extension motion is aborted (block 208), or a retraction is requested (block 210), whichever occurs first.

It will be appreciated that while the method 200 is shown as having two parallel paths performed simultaneously, this embodiment is for exemplary only. Other embodiments are contemplated in which the method proceeds along a single path in which the same or similar steps are performed to achieve the same functional and monitoring objectives, and such embodiments should be considered within the scope of the present disclosure.

It will further be appreciated that the described monitoring pathway of block 400 is exemplary only. In other embodiments, the monitoring pathway may monitor for any type of fault or any suitable command that relates to the support system 108. Further, the resulting action taken in response to a detected fault or received command is not limited to aborting the extension motion or indicating a retraction request. In this regard, the embodiments are contemplated in which the monitoring pathway of block 400 reacts to any suitable input and performs any number of suitable corresponding steps in response. These and other embodiments are contemplated and should be considered within the scope of the present disclosure.

Figure 4:
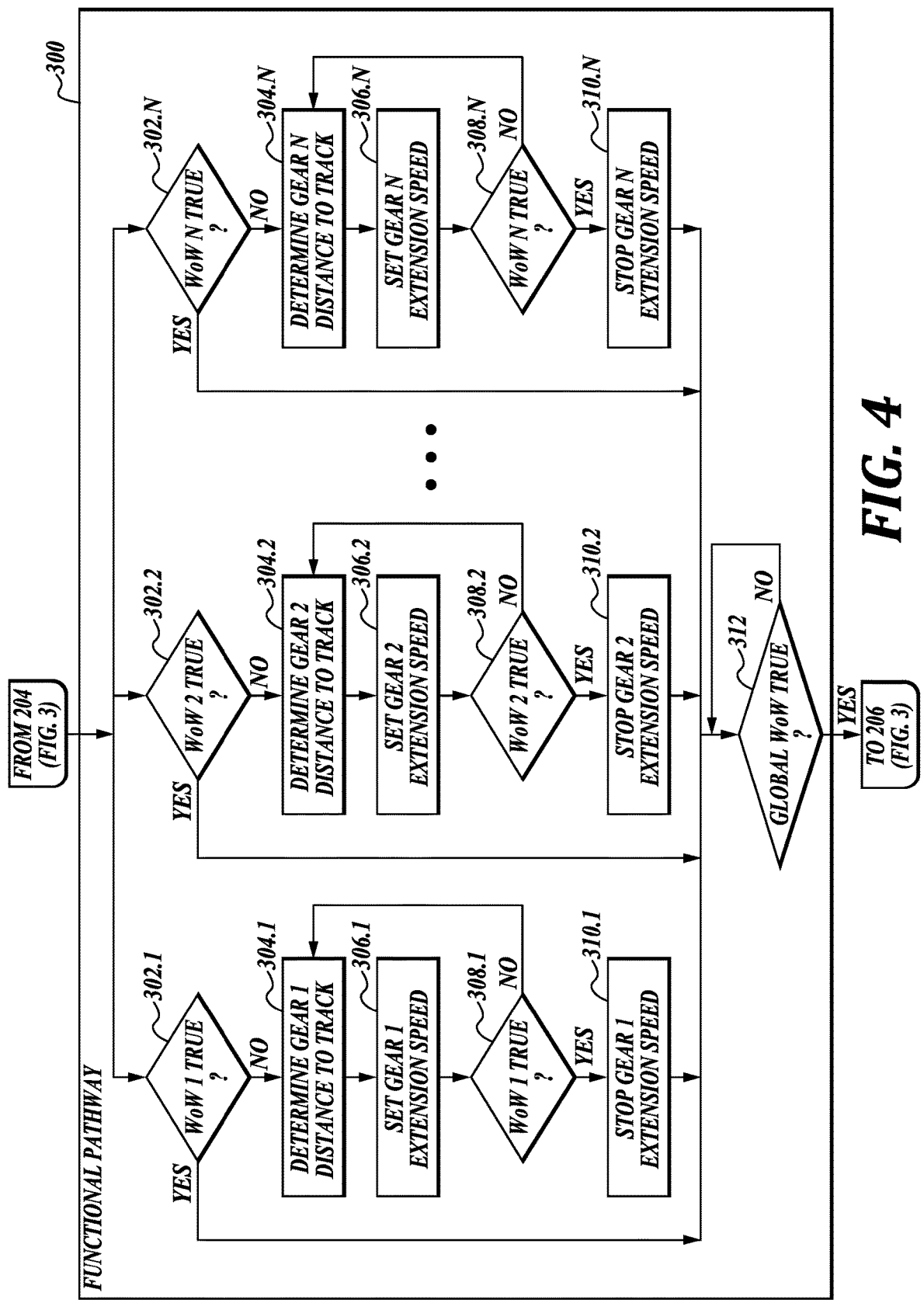
FIG. 4 shows a flow chart of a functional pathway of the method shown in FIG. 3.

Referring to FIG. 4, a representative embodiment of a functional pathway of block 300 will be described. Block 300 includes a number of processes performed in parallel, wherein each process relates to a particular landing gear assembly. In the illustrated embodiment, the steps of block 300 are described for use with a support system 108 with a number N of landing gear assemblies, wherein the processes for a first, second, and Nth landing gear assembly are shown, and the steps of each process are identified with a reference number that indicates the landing gear assembly to which the step applies. For example, block 302.Y indicates block 302 as applied to the Yth landing gear assembly, wherein Y is a number from 1 to N. To avoid repetition, the steps related to the first landing gear assembly will be described using reference numbers 3XX.1 with the understanding that corresponding steps are carried out for each of the other landing gear assemblies.

Within block 300, the method 200 proceeds to block 302.1, as well as to a corresponding blocks 302.Y for each of the other landing gear assemblies. In block 302.1, a WoW check is performed to determine if WoW status is TRUE. If WoW status is TRUE, that landing gear assembly is considered to be extended, and the method proceeds to block 312. If the WoW state is not TRUE, then the extension of that landing gear assembly begins by proceeding to block 304.1.

In block 304.1, the distance between the ground surface and a reference point on the landing gear assembly is estimated or measured. In some embodiments, the reference point on the landing gear assembly is the bottom of the tire in the uncompressed position, the bottom of the tire in the static position, or any other suitable feature of or associated with the landing gear assembly. In some embodiments, the distance between the reference point and the ground surface is estimated using one or more of kinematics, vehicle static weight information, gear deployment data, or and other suitable methods and information. In other embodiments, the distance is measured directly by one or more sensors positioned on the landing gear assembly, the ground, or any other suitable locations or combinations thereof.

The method 200 proceeds to block 306.1, in which an extension speed for the landing gear assembly is set. In an embodiment, the extension speed of the landing gear assembly is constant throughout the entire extension motion. In another embodiment, the extension speed varies as a function of the distance between the ground surface and a reference point on the landing gear assembly. For example, in an embodiment, the extension speed decreases as the landing gear assembly approaches touchdown, which results in reduced impact loads. The speed profile may be same for all landing gear assemblies or set for each individual landing gear assembly such that, for example, touchdown occurs simultaneously.

In an embodiment, extension speed is a function of a feedback control in which the distance to the ground is a control input. Based on a continuous determination of the distance to the ground for each landing gear assembly, the speed of each landing gear assembly is individually controlled to ensure that touchdown for the landing gear assemblies occurs simultaneously.

The method 200 proceeds to block 308.1, in which a WoW status is checked. If WoW status is not TRUE, the process returns to block 304.1, and a new distance to ground is determined. If WoW status is TRUE, the method 200 moves to block 310.1, and the extension of the landing gear assembly stops.

In block 312, the step of determining the global WoW status is performed. If the WoW status for all of the landing gear assemblies is not TRUE, then the global WoW status is not TRUE, and the method 200 remains at block 312. Once the WoW status for all of the landing gear assemblies is TRUE, then the global WoW status is TRUE, and the method 200 proceeds from block 312 (and more generally, block 300) to block 206. In block 206, the extension of the support system 108 is considered successful.

Figure 5:
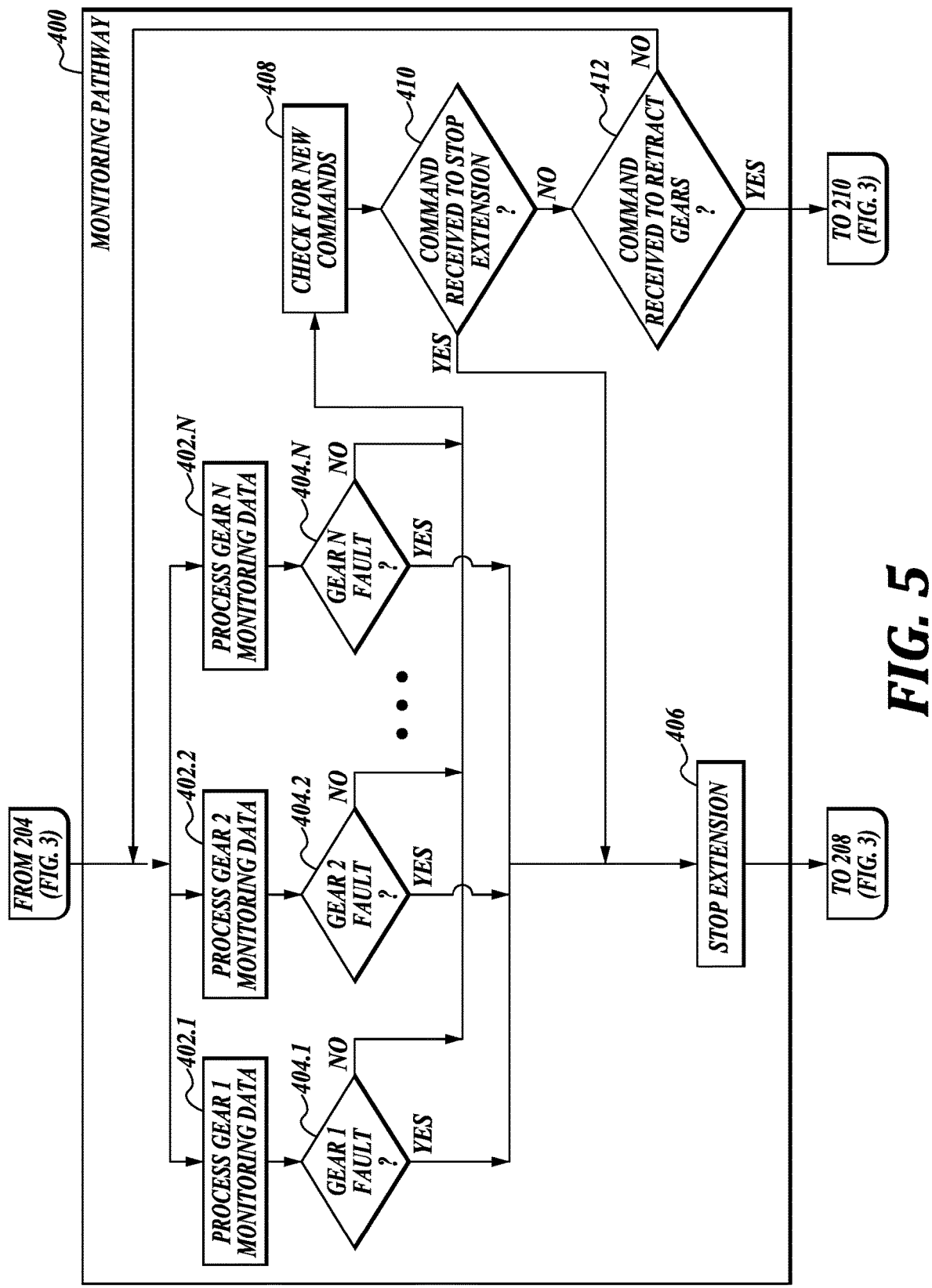
FIG. 5 shows a flow chart of a monitoring pathway of the method shown in FIG. 3.

Referring now to FIG. 5, a representative embodiment of a monitoring pathway of block 400 will be described. Within block 400, a number of processes are shown being performed in parallel, wherein each process relates to one landing gear assembly. In the illustrated embodiment, block 400 is described for use with a support system 108 with a number N of landing gear assemblies, wherein the processes for a first, second, and Nth landing gear assembly are shown, and the steps of each process are identified with a reference number that indicates the landing gear assembly to which the step applies. For example, block 402.Y indicates block 402 as applied to the Yth landing gear assembly, wherein Y is a number from 1 to N. To avoid repetition, the blocks related to the first landing gear assembly will be described using reference numbers 4XX.1 with the understanding that corresponding blocks are included in the steps related to each of the other landing gear assemblies.

Within block 400, the method 200 proceeds to block 402.1, as well as to a corresponding block 402.X for each of the other landing gear assemblies. In block 402.1, the data related to the status, function, and/or operating conditions of the landing gear assembly 110.1 is collected and processed. In one embodiment, the data includes one or more of landing gear assembly position, tire pressure, shock absorber position and/or pressure, distance to ground, actuator torque, electrical actuator voltage, pneumatic or hydraulic actuator pressure, or any other suitable data. In some embodiments, the data is sensed directly by one or more sensors 106. In some embodiments, the data is calculated or estimated based upon sensed and/or predetermined factors.

The method 200 proceeds to block 404.1, in which the MSSCU 104 analyzes the data collected and processed in block 402.1 to determine the presence of any faults that would require that extension of the landing gear assembly be stopped. In some embodiments, the faults may include but are not limited to the jamming of an actuator, loss of power, over extension of the landing gear assembly, or any other fault reasonably that could result in undesirable consequences if further extension of the landing gear assembly were to occur.

If landing gear assembly faults are found in block 404.1, the method 200 proceeds to block 406, and extension of the landing gear assembly is stopped, after which, the method 200 proceeds to block 208. If no gear faults are found in block 404.1, the method 200 proceeds to block 408.

In block 408 a check is performed for any new commands from the ECU, MSSCU or any other control unit. In the illustrated embodiment, commands include stop extension and retract gear, however, other embodiments are contemplated in which commands include abort extension; hold extension, standby, or any other suitable command or combination of commands.

The method 200 proceeds to block 410, in which it is determined if a command has been received to stop extension of the landing gear assembly. If a stop extension command has been received, the method 200 proceeds to block 406, and further extension of the landing gear assembly is prevented. From block 406, the method 200 proceeds to block 208.

If no stop extension command is determined to have been received in block 410, the process proceeds to block 412, in which it is determined if a command to retract the landing gear assembly has been received. If no command to retract the landing gear assembly has been received, the method returns to blocks 402.1-402.N, and monitoring of the landing gear assemblies continues. If a command to retract the landing gear assembly has been received, then the method 200 continues to block 210.

Embodiments of the disclosed method 200 provide supervised extension of the support system 108 of a maglev vehicle 100. More specifically, the method 200 enables simultaneous touchdown of the landing gear assemblies and also prevents undesirable conditions that result from staggered landing gear assembly touchdown and/or landing gear assembly faults that prevent normal extension of one or more landing gear assemblies.

In some situations, it is desirable to allow for continued motion of a landing gear assembly after it has reached WoW status, but before the support system has reached global WoW status. In some embodiments, the landing gear assemblies continue to extend after WoW status has been achieved in order to actively control the height of the vehicle relative to the ground surface. In some embodiments, the height of the vehicle above the ground surface is increased to achieve a specific clearance between the magnets and the track to reduce magnetic drag effects. In some embodiments, the height of the vehicle above the ground surface may be increased to a predetermined level to align the vehicle with a docking station feature.

In an actual system, touchdown of all landing gear assemblies will not occur simultaneously. For embodiments in which further extension of the landing gear assemblies occurs after a successful support system extension, performance may be reduced by stopping a particular landing gear assembly, even if only for a short time, while waiting for other landing gear assemblies to reach the WoW position. Accordingly, it can be desirable to allow one or more landing gear assemblies to continue to extend past WoW, even if global WoW status has not been achieved. This motion beyond WoW continues until global WoW status has been achieved or a predetermined time limit has been reached. Such post-extension motion is generally subject to being ended by commands from the monitoring path of block 400.

Figure 6:
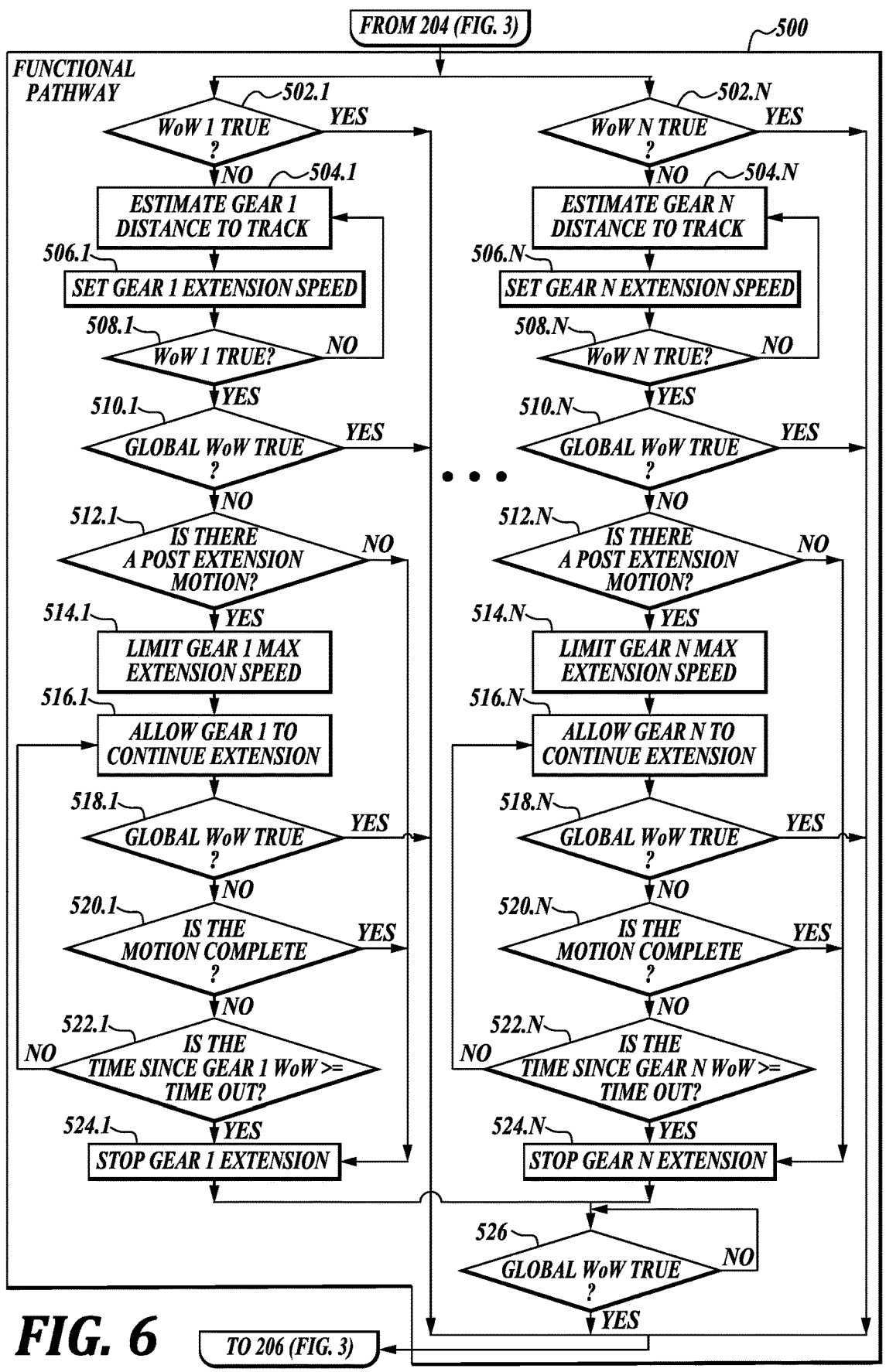
FIG. 6 shows a flow chart of a second representative embodiment of the functional pathway shown in FIG. 4.

FIG. 6 shows a representative embodiment of a functional pathway of block 500 that can be used in place of block 300 shown in FIG. 3 in order to allow for post-extension motion of individual landing gear assemblies before global WoW status is reached. Block 500 includes a number of processes performed in parallel, wherein each process relates to a landing gear assembly. In the illustrated embodiment, the steps of block 500 are described for use with a support system 108 with a number N of landing gear assemblies, wherein the processes for first and Nth landing gear assemblies are shown, and the steps of each process are identified with a reference number that indicates the landing gear assembly to which the step applies. For example, block 502.1 indicates block 502 as applied to the first landing gear assembly 110.1, and block 502.N indicates block 502 as applied to the Nth landing gear assembly 110.N. To avoid repetition, the steps related to the first landing gear assembly will be described using reference numbers 5XX.1 with the understanding that corresponding steps are included in the steps related to each of the other landing gear assemblies.

Within block 500, the method 200 proceeds to block 502.1, as well as to a corresponding block 502.X for each of the other landing gear assemblies. In block 502.1, a WoW check is performed to determine if WoW status is TRUE. If WoW status is TRUE, that landing gear assembly is considered to be extended, and the method proceeds to block 510.1. If the WoW state is not TRUE, then the extension of that landing gear assembly begins by proceeding to block 504.1.

In block 504.1, the distance between the ground surface and a reference point on the landing gear assembly is estimated or measured in a manner similar to that of the previously described embodiment of block 300.

The method 200 proceeds to block 506.1, in which an extension speed for the landing gear assembly is set. In an embodiment, the extension speed of the landing gear assembly is constant, decreases as the landing gear assembly approaches touchdown, or is based on a continuous determination of the distance to the ground for each landing gear assembly.

The method 200 proceeds to block 508.1, in which a WoW status is checked. If WoW status is not TRUE, the process returns to block 504.1, and a new distance to ground is determined. If WoW status is TRUE, the method 200 moves to block 510.1.

In block 510.1, the step of determining the global WoW status is performed. If the WoW status for all of the landing gear assemblies is not TRUE, then the global WoW status is not TRUE, and the method 200 continues to block 512.1. If the global WoW status is TRUE, the functional path of block 500 is complete, and the method 200 proceeds from block 510.1 (and block 500) to block 206. In block 206, the extension of the support system 108 is considered successful.

In block 512.1, the system checks for post-extension motion in the extension direction. If no post-extension motion in the extension direction is not required, the method 200 proceeds to block 524.1 If post-extension motion in the extension direction is required, the method 200 proceeds to block 514.1

In block 514.1, the landing gear assembly continues to extend, but the velocity of the landing gear assembly extension is changed to a post-WoW velocity. In some embodiments, the post-WoW velocity is a constant velocity. In some embodiments, the post-WoW velocity varies according to feedback control. It will be appreciated other embodiments are possible in which the post-WoW velocity is determined according to any number of suitable factors.

In block 516.1, the landing gear assembly continues to extend at the post-WoW velocity. The method 200 proceeds to block 518.1, in which the global WoW status is determined. If the global WoW status is not TRUE, and the method 200 continues to block 520.1. If the global WoW status is TRUE, the functional path of block 500 is complete, and the method 200 proceeds from block 518.1 (and block 500) to block 206, and the extension of the support system 108 is considered successful.

In block 520.1, the system determines if the post-extension motion has been completed. If the post-extension motion has been completed, the method 200 proceeds to block 524.1. If the post-extension motion has not been completed, the method 200 proceeds to block 522.1

In block 522.1, the system determines if the time that has elapsed since WoW was achieved for the landing gear assembly has exceeded a pre-determined time limit. If the predetermined time limit has not been exceeded, the process returns to block 516.1, and post-extension motion continues. If the predetermined time limit has been exceeded, the method 200 proceeds to block 524.1.

In block 524.1, the post-extension motion of the landing gear assembly is stopped, and the method 200 proceeds to block 526. In block 526, the system checks the global WoW status. If the global WoW status is not TRUE, then the method remains at block 526.1 until the global WoW status is determined to be TRUE. When the global WoW status is determined to be TRUE, the functional path of block 500 is complete, and the method 200 proceeds from block 526 (and block 500) to block 206, and, the extension of the support system 108 is considered successful.

Embodiments are also contemplated in which one or more of the landing gear assemblies continue to extend after WOW status is reached for one landing gear assembly, all landing gear assemblies (global WOW), or any combination of landing gear assemblies. For such embodiments, a final extension position each of the landing gear assemblies is not determined by reaching global WOW or even WOW status for some of the landing gear assemblies. In some embodiments, post-WOW extension continues for some or all landing gear assemblies until the maglev vehicle reaches a predetermined height above the support surface. In some embodiments, the predetermined height beyond global WOW status ensures that the vehicle is properly aligned with certain interfaces at the docking station to ensure proper docking procedures.

In some embodiments, extension and/or retraction for some or all landing gear assemblies occurs after global WOW or a predetermined maglev vehicle height has been reached. In some embodiments, individual landing gear assemblies are extended or retracted global WOW or a predetermined maglev vehicle height has been reached in order to stabilize the vehicle motion. In some embodiments, the individual landing gear assemblies are selectively extended and retracted to provide an active damping force that counteracts undesirable oscillation of the maglev vehicle.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the disclosed subject matter in which an exclusive property or privilege is claimed are defined as follows:

1. A method of extending a support system for a maglev vehicle, the support system comprising a first landing gear assembly and a second landing gear assembly, the method comprising the steps of:
   determining a weight-on-wheels status for each of the first and the second landing gear assemblies;
   determining a distance from each of the first and second landing gear assemblies to a support surface;
   setting a first extension speed for the first landing gear assembly and a second extension speed for the second landing gear assembly;
   extending the first landing gear assembly at the first extension speed until the first landing gear assembly reaches a weight-on-wheels condition; and
   extending the second landing gear assembly at the second extension speed until the second landing gear assembly reaches the weight-on-wheels condition.

2. The method of claim 1, further comprising the steps of:
   receiving a command to stop extension of the support system; and
   stopping further extension of the support system in response to the received command.

3. The method of claim 1, further comprising the steps of:
   receiving a command to retract the support system; and
   retracting the support system in response to the received command.

4. The method of claim 1, wherein the first and second extension speeds are set so that the first and second landing gear assemblies reach the weight-on-wheels condition simultaneously.

5. The method of claim 4, wherein each of the first and second extension speeds vary during extension of the support system in response to feedback regarding the distance from each of the first and second landing gear assemblies, respectively, to the support surface.

6. The method of claim 4, wherein each of the first and second extension speeds decreases as the first and second landing gear assemblies approach the weigh-on-wheels condition.

7. The method of claim 1, further comprising the step of continuing to extend the first landing gear assembly after the first landing gear assembly reaches the weigh-on-wheels condition.

8. The method of claim 7, further comprising the step of determining a post weight-on-wheels extension speed, wherein the first landing gear assembly is extended at the post weight-on-wheels extension speed after reaching the weigh-on-wheels condition.

9. The method of claim 8, wherein the extension of the first landing gear assembly terminates after a predetermined amount of time has passed after reaching the weight-on-wheels condition.

10. The method of claim 9, wherein the extension of the first landing gear assembly terminates when the second landing gear assembly reaches the weight on wheels condition if the second landing gear assembly reaches the weight on wheels condition before the predetermined amount of time has passed.

11. A vehicle, comprising:
    first and second landing gear assemblies; and
    one or more control units, in order to extend the first and second landing gear assemblies, is programmed to:
      determine a weight-on-wheels status for each of the first and the second landing gear assemblies;
      determine a distance from each of the first and second landing gear assemblies to a support surface;
      set a first extension speed the first landing gear assembly and a second extension speed for the second landing gear assembly;
      extend the first landing gear assembly at the first extension speed until the first landing gear assembly reaches a weight-on-wheels condition; and
      extend the second landing gear assembly at the second extension speed until the second landing gear assembly reaches the weight-on-wheels condition.

12. The vehicle of claim 11, further comprising:
    a first sensor configured to sense a first distance from a feature of the first landing gear assembly to the support surface; and
    a second sensor configured to sense a second distance from a feature of the second landing gear assembly to the support surface.

13. The vehicle of claim 11, wherein each of the first and second landing gear assemblies comprises:
    a wheel assembly;
    an actuator assembly operably coupled to the wheel assembly to reciprocate the wheel assembly between an extended position and a retracted position; and
    a motor control unit programmed to control the actuator to selectively position the wheel assembly.

14. A non-transitory computer-readable medium having computer-executable instructions stored thereon that, in response to execution by one or more controls unit of a vehicle, cause the one or more control units to perform actions comprising:
    determining a weight-on-wheels status for each of the first and the second landing gear assemblies;
    determining a distance from each of a first and second landing gear assemblies to a support surface;
    setting a first and second extension speed for each of the first and second landing gear assemblies, respectively;
    extending the first landing gear assembly at the first landing gear speed until the first landing gear assembly reaches a weight-on-wheels condition; and
    extending the second landing gear assembly at the second landing gear speed until the second landing gear assembly reaches the weight-on-wheels condition.

* * * * *